United States Patent

[11] 3,588,249

[72] Inventor Robert H. Studebaker
5343 Kellenburger, Dayton, Ohio 45424
[21] Appl. No. 740,814
[22] Filed June 17, 1968
[45] Patented June 28, 1971
Continuation-in-part of application Ser. No. 468,821, July 1, 1965, now abandoned, and Ser. No. 474,684, July 26, 1965, now abandoned.

[54] LASER BEAM SURVEY APPARATUS
16 Claims, 13 Drawing Figs.
[52] U.S. Cl. ............................ 356/4,
33/46.2, 172/1, 172/2, 250/236, 331/94.5, 350/285, 356/172
[51] Int. Cl. ............................ G01c 3/08, A01b 69/00
[50] Field of Search ............................ 33/60, 69, 70; 37/(AC); 240/49; 172/52, 4; 350/72, 285; 356/138, 4, 152

[56] References Cited
UNITED STATES PATENTS

| | | | |
|---|---|---|---|
| 862,293 | 1907 | Swasey | 350/85 |
| 1,006,230 | 1911 | Kollmorgen | 350/85 |
| 1,161,995 | 1915 | Styll | 350/85 |
| 2,497,933 | 1950 | Devers | 33/69 |
| 2,796,685 | /1957 | Bensinger | 37/A.C. |
| 2,973,593 | 3/1961 | Zellner et al. | 37/A.C. |
| 3,242,340 | 3/1966 | Layne | 250/208(X) |
| 3,266,014 | 8/1966 | Leotta | 240/49(X) |
| 3,290,986 | 12/1966 | Woehl | 356/138 |
| 3,314,068 | 4/1967 | Verive | 33/74(A) |
| 3,469,919 | 9/1969 | Zellner | 331/94.5 |

OTHER REFERENCES
K. M. Wallace, Maser Surveying, Surveying and Mapping, vol. XXII, 04,1962

Primary Examiner—Ronald L. Wibert
Assistant Examiner—J. Rothenberg
Attorney—Beveridge & DeGrandi ABSTRACT: This invention relates to a device for supporting and rotating a laser beam in establishing a survey reference plane with exacting accuracy. The device comprises a hollow housing in the cavity of which a laser beam generator is contained with the laser beam projecting out an open end of the housing cavity, the housing being supported for adjustment with reference to a unitary beam deflecting device having multiple reflecting surfaces that deflect the reflected beam at a fixed angle relative to the incoming beam rotatably mounted on the open end of the housing for comovement therewith, the deflecting device being rotated as a unit substantially about the axis of the housing.

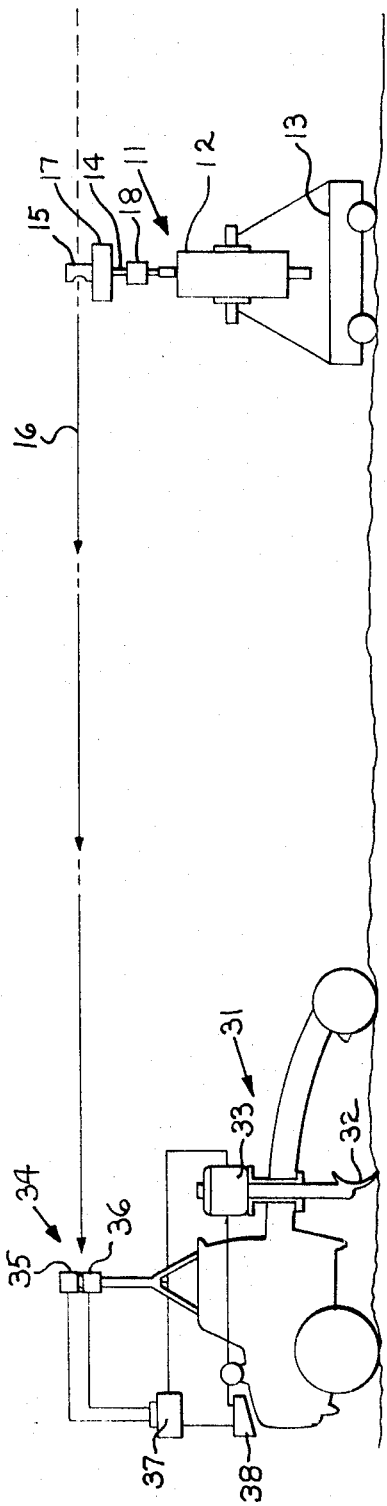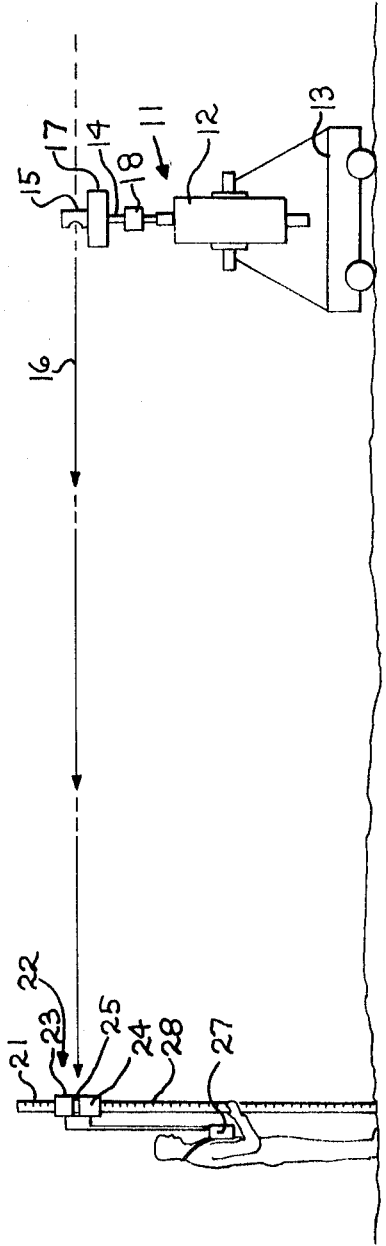

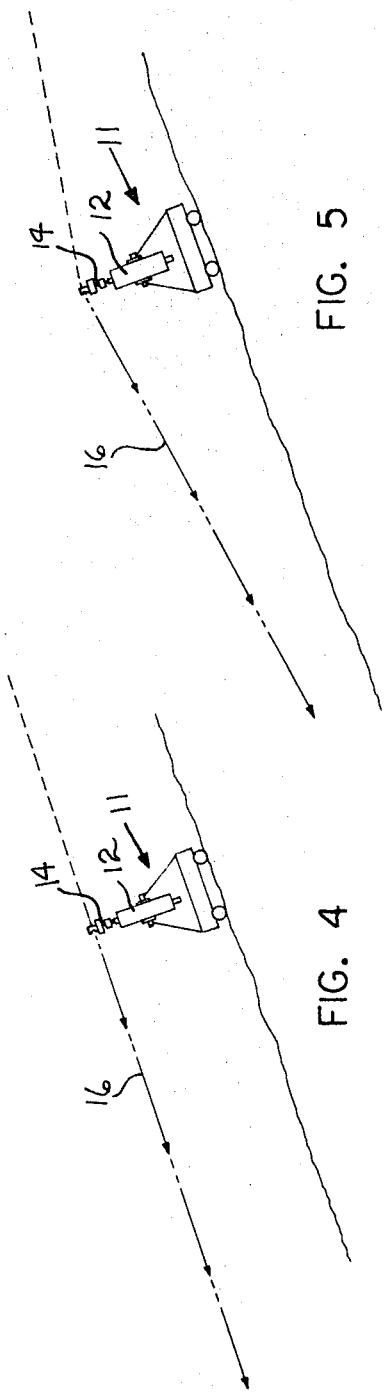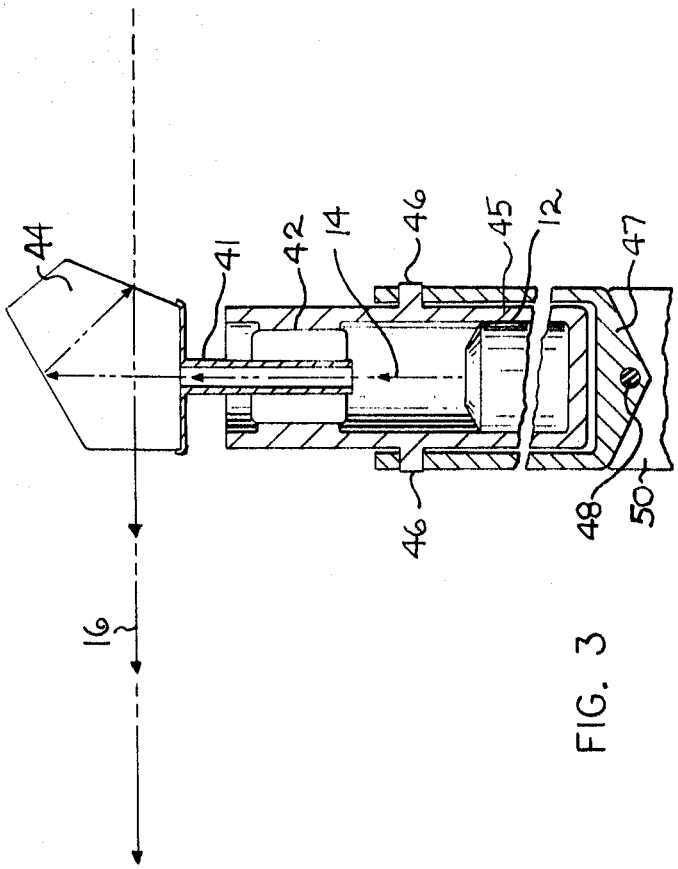

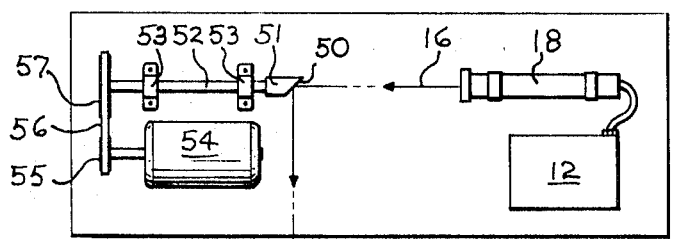
FIG. 6
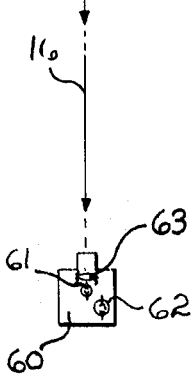
FIG. 8
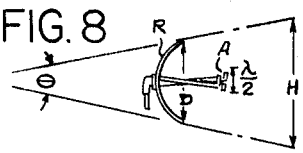
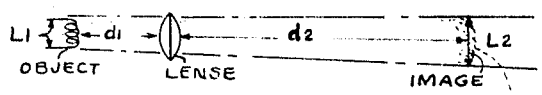
FIG. 7
INVENTOR.
ROBERT H. STUDEBAKER
BY W. A. Schaich
T. A. Meehan
ATTORNEYS INVENTOR.
ROBERT H. STUDEBAKER
BY W. A. Schaich
& T. A. Meehan
ATTORNEYS INVENTOR
ROBERT H. STUDEBAKER
BY W. A. Schaich
 & T. A. Meehan
ATTORNEYS

LASER BEAM SURVEY APPARATUS

This application constitutes a continuation-in-part of applicant's copending Application Ser. No. 468,821, filed July 1, 1965, and Ser. No. 474,684, filed July 26, 1965, both applications being now abandoned. This invention relates to method and apparatus for the generation and utilization of a signal receivable at a distance and indicative of a surveying reference or datum plane or elevation, which plane may be horizontal or at any desired angle thereto. Such a signal may be utilized to advantage in establishing elevation or grade in the practice of surveying and map making and in controlling the operation of machines performing operations subject to close elevation tolerances such as grading, earth moving, ditch digging, pipe laying, and the like. More particularly, the invention relates to the generation of a signal beam of electromagnetic waves in which the beam has minimal tendency to diverge in relation to the divergence of conventional light beams, radio signals and other like signals emitted by point sources and to the projection of such signal beam by turning in an arcuate path to provide periodic signals indicative of a datum plane or elevation at an indefinite number of locations in the plane traversed by the signal beam. Specifically, the invention relates to the projection of a signal beam of planar configuration generated by utilizing the stimulated emission of radiation by a quantum device, commonly called a laser, causing such beam to rotate in an endless path and providing receiver means in the plane periodically traversed by the signal beam for reception of the signal beam to provide an indication of elevation at the location of the receiver means.

Heretofore, the determination of the elevation of a particular location has been accomplished mainly by means of optical devices, i.e., the familiar surveyor's transit and target rod, in accordance with well-known procedures and practices. Each such determination involves a fair amount of time of several individuals far too long to constitute an acceptable technique for continuously monitoring the performance of an operation subject to close elevation tolerances during the period of time that the operation is being performed, and each determination is subject to error in the use of instruments.

It has, however, previously been proposed that the determination of elevation can be effected sufficiently rapidly for control of various elevation-critical operations by means of a receiver associated with the operating device that is sensitive to a single beam signal transmitted at a predetermined elevation. In such cases, however, the proposed transmitting device was of a type transmitting from a point source, such as a conventional light source, and thereby subject to a relatively considerable divergence along the path of travel from the transmitter to the receiver. Such signal divergence adversely effected the accuracy of the control schemes utilizing signals transmitted in the foregoing manner, greatly limited the maximum spacing between the transmitter and receiver that would be effective for acceptable control, and necessitated precise alignment between transmitter and receiver in the horizontal as well as the vertical plane.

The deficiencies of utilizing conventional sources of radiant energy in elevation measurement and control systems, as represented by U.S. PAT. No. 2,973,593 to Zellner, et al., No. 3,000,121 to Kuehne, et al., and No. 2,796,685 to Bensinger, can be readily appreciated by referring to the conventional beam-producing arrangements shown in FIGS. 7 and 8 of the drawings and making a few simple calculations. FIG. 7 shows schematically a system for producing a beam of ordinary light. The light source F necessarily has to have a discrete dimension, indicated as $L_1$. It will also necessarily be located a distance $D_1$ from the lens. As a result, the fundamental law of optics teaches that at any distance $D_2$ from the lens, the beam image $F_1$ will be produced having a physical dimension $L_2$. The relationship between the size of image $L_2$ and the distance $D_2$ is expressed by the following simple equation:

$$\frac{L_1}{D_1} = \frac{L_2}{D_2}$$

which may be converted to:

$$L_2 = \frac{L_1 D_2}{D_1}$$

Assuming that light source F could be found that would produce enough energy to be detected at 1000 ft., and that such light source had a minimum height $L_1$ of 0.25 inches and was located a distance $D_1$ of 1 foot from the lens, then when $D_2$ equals 1000 ft., $L_2$ will be equal to 20.8 ft. It can be readily seen that a light beam of such width, even if it could be detected in daylight, would be completely incapable of measuring elevation or controlling the elevation of a working tool over the entire area traversed by the beam to the required accuracy, which is normally less than one-fourth inch.

Referring to FIG. 8, there is shown a conventional arrangement for projecting a microwave beam. An antenna A is shown, which for efficient transmission purposes must have a height of one-half wave length of $\lambda/2$. A spherical segment reflector R is placed behind such antenna and the vertical chordal distance of such spherical segment is represented by the dimension D. With such an arrangement, the resulting divergence angle $\theta$ of the reflected beam is expressed by the equation:

$$\theta = \theta/2D$$

Any practical, and relatively inexpensive, transmitter that is commercially available will have a wave length in excess of 2.5 cm. Hence, assuming that a minimum wave length transmitter is employed where $\theta$ equals 2.5 cm, the above equation reduces to $\theta = 1.25/D$. It will thus be seen that the small dimension D is made, the greater will be the divergence angle. At the same time, the larger the reflector dimension D, the greater will be the beam width (height) at any point. Hence for a minimum divergence system which still does not involve an excessively large reflector or an excessively large beam height, assume that D = 100 cm. The angle $\theta$ then equals 0.0125 radians or 0.70°. Simple calculations will show that the resulting beam height H at 1000 ft. will be equal to 45.2 ft. Again, this great divergence of the beam will make it impossible to use the beam at all distances, say from 50 ft. from the transmitter to 1000 ft., and effect elevation measurements or vertical control of the working tool of an implement to an accuracy of plus or minus 0.25 inches.

Lastly, any short wave beam will reflect from any object in the area and produce ghost signals regardless of where the reflecting object is located relative to the beam responsive device, therefore, in the normal construction work area there would be literally a multitude of ghost signals produced by reflections from telephone or power lines, trees, buildings, or other vehicles working in the area, and the ghost signals would make the accuracy of any short wave beam responsive device completely unpredictable.

Only the laser beam has such a minimal divergence and high energy intensity as to permit a single laser beam to effectively and accurately control a plurality of implements moving independently in a working area of 1000 feet or more in radius. Lastly, a control beam of ordinary light suffers greatly from the signal competition offered by the ambient light. Certainly the effective range of an ordinary light beam on a bright sunshine day will be greatly reduced; moreover, the beam reception device will respond to accidental energizations produced by the device being directly exposed to the sun, or to reflections from other components of the vehicle, or passing vehicles. In contrast, when using a laser beam as the reference plane, the photocell or cells to be energized by the laser beam may be positioned behind a narrow band pass optical filter which will permit substantially unimpeded passage of any light energy having the frequency of the laser beam, but will effectively screen out all effects of ambient light, thus permitting the control system to be equally effective on bright days as on cloudy days.

Due to the foregoing disadvantages of previously proposed techniques for determining elevation by reference to a light beam or other divergent beam at a predetermined elevation, such techniques have not been acceptable to most prior artisans either in the determination of elevation in surveying and map making or in the elevation control of elevation-critical operations such as earth grading.

It has now been found, however, that an electromagnetic wave signal generated by a quantum device operating according to the principle of stimulated emission of radiation, commonly referred to as a laser, is capable of transmitting a signal at a predetermined elevation with such minimal divergence as to constitute an acceptable control signal for control of an elevation-critical operation, such as earth grading, at substantial distances from the signal generator, even when such signal is received only periodically by receiver or sensing means associated with the machine performing such operation. The fact that control of such an operation can be obtained by a periodically received signal is believed to be highly and unexpectedly advantageous in that it eliminates the need for maintaining precise alignment between the transmitter and receiver along a virtually lineal path of travel. Thus, by sweeping a laser beam in a planar path periodically overlying the location of a moving earth grader, receiver or sensing means associated with the grader will be periodically subjected to the laser beam notwithstanding changes in alignment or spacing between the laser device and the machine. Likewise, the projection of the laser beam in a planar path makes it possible to independently conduct a number of elevation determinations and/or perform a number of elevation-critical operations at any number of locations within the effective range of the laser beam by reference to the elevation of a single laser beam. Lastly, a laser beam may be readily detected in daylight at a substantial distance from the source of such beam, because the monofrequency characteristics of such beam permit highly effective filter blocking of ambient light.

A system utilizing the laser beam greatly facilitates surveying operations and may also be utilized to simultaneously control earth working operations of a plurality of grading machines, scrapers, mining equipment, or the like, each of which being provided with laser beam pick up means and suitable control arrangements responsive to the laser beam for adjusting the elevation of the implement to maintain such implement at a preselected displacement relative to the laser beam reference plane, irrespective of the terrain variations.

It will be understood by those skilled in the art that many of the terms utilized in this specification and claims are relative. Thus, in describing the invention, emphasis has been directed to conventional surveying operations wherein the rotating beam is moving in either a horizontal plane or a plane inclined at a slight angle to the horizontal. Laser beam generators embodying this invention may be applied to effect surveying measurements or utilized as a surveying reference plane for structures or operations requiring a vertical reference plane. In this case, the axis of rotation of the rotating laser beam would be generally horizontal, and supports other than the conventional tripod legs would have to be provided for the primary base member. Furthermore, for lack of an adequate generic term, I have employed in the claims the term "surveying reference apparatus." A device embodying this invention may obviously be utilized for setting up a laser beam reference plane for surveying operations, but the same plane may be advantageously utilized for controlling the vertical movements of the working tool of various types of earthworking implements; hence, the term "surveying reference" is intended to include all utilizations of the reference plane established by the rotating laser beam.

A main object of this invention is to provide an improved method and apparatus for establishing a surveying reference plane.

Another important object is to provide an improved method and apparatus for establishing a reference plane for controlling the elevation of earth moving equipment.

Another object of this invention is to provide a simple, portable planar laser beam generator which can be quickly set up on any type of terrain and accurately adjusted to produce a laser beam rotating in a plane which is exactly horizontal with respect to gravity and the elevation of which may be conveniently adjusted.

Still another object of this invention is to provide a portable laser beam generator capable of producing a laser beam rotating about an axis characterized by the fact that the rotatable axis of the laser beam may be precisely aligned with a ground reference point.

A further object of this invention is to provide an improved method of surveying utilizing a rotating or oscillating laser beam.

Other and further objects and advantages of this invention will become apparent to those skilled in the art from the following detailed description thereof, taken in conjunction with the annexed sheets of drawings on which a preferred embodiment of this invention is illustrated.

FIG. 1 is an elevation view schematically illustrating one form of apparatus in accordance with the present invention used in the practice of surveying;

FIG. 2 is an elevation view schematically illustrating one form of apparatus in accordance with the present invention used in the control of an earth grading operation;

FIG. 3 is an elevation view schematically illustrating a modified apparatus for generating a rotating laser beam for utilization in practicing this invention;

FIG. 4 is a schematic elevational view of one arrangement in accordance with this invention for establishing an inclined reference beam plane; and FIG. 5 is a schematic elevational view of a modified arrangement in accordance with this invention for establishing an inclined reference beam plane;

FIG. 6 is a schematic plan view of a modified arrangement in accordance with this invention for establishing a vertical plane reference beam;

FIGS. 7 and 8 are schematic views of conventional light and shortwave beams transmitting arrangements;

Figures 9, 10:
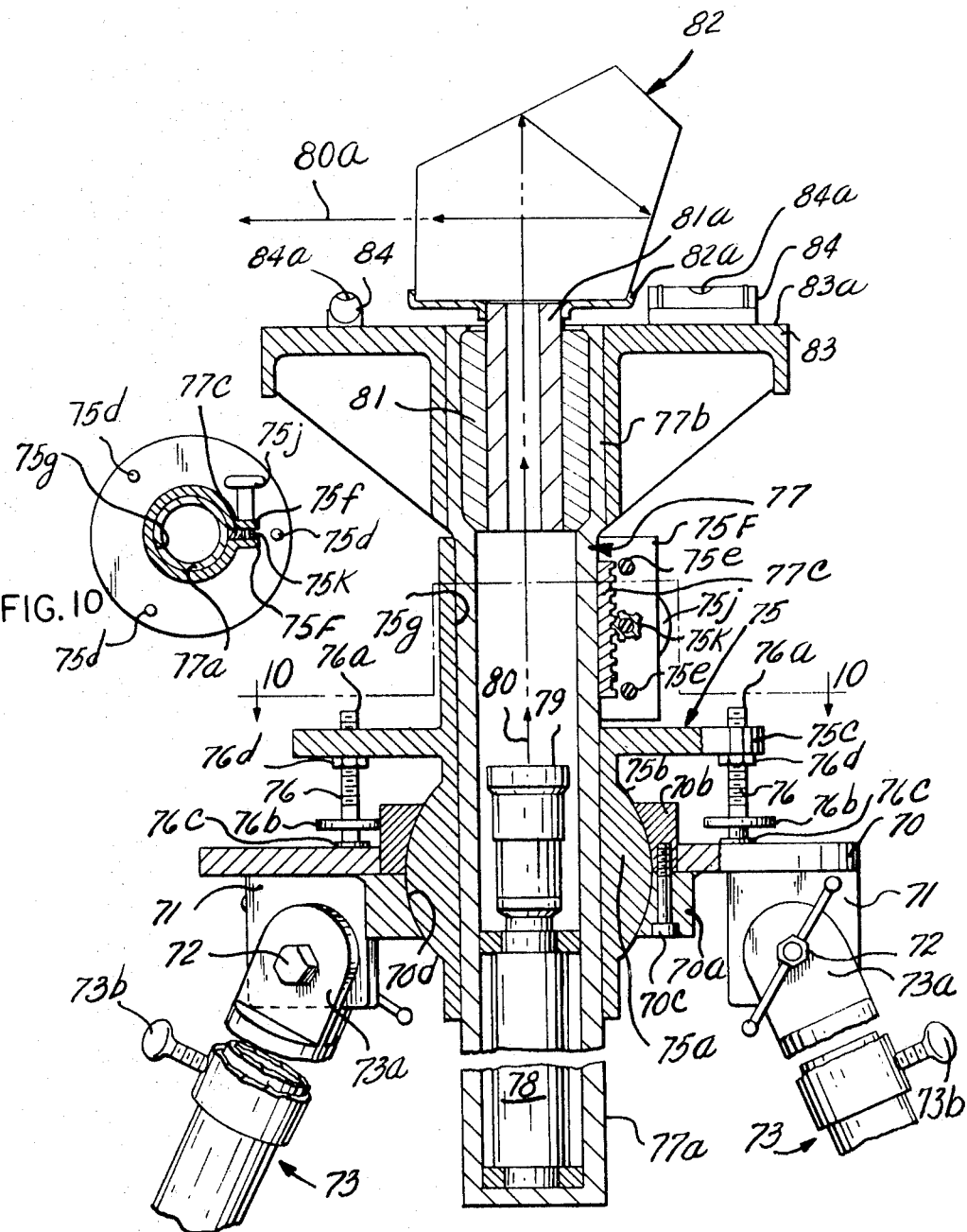
FIG. 9 is a sectional side elevation of another embodiment of the invention.
FIG. 10 is a reduced sectional view taken on the plane 10–10 of FIG. 9.

In accordance with the practice of the present basic invention, as is illustrated in FIG. 1, there is provided signal generating means, indicated generally at 11, comprising a quantum device 12, commonly referred to as a laser source, disposed in an upright manner and supported by a portable truck or trailer 13. Truck 13 should be suitable to house the power equipment for operating laser source 12; it should be solid enough to isolate laser sources 12 from the the effect of nearby vibrations; it should be sufficiently mobile, and preferably self-powered, to move over rough terrain; and it should have means for supporting laser source 12 with conventional elevation, angular and leveling adjustments as accurate and as precise as the similar adjustment features of a fine transit. It is contemplated that quantum device 12 can comprise any suitable device for generating an electromagnetic wave signal of minimal tendency to diverge by the stimulated emission of radiation; however, excellent results have been obtained in tests to date using a gas laser manufactured by Perkin-Elmer Corporation, of Norwalk, Connecticut, under their designation Model 5200, and such a device is presently the preferred device.

Laser source 12 is preferably so mounted in relation to truck 13 as to be nonturnable or rotatable relative thereto in order to simplify the construction of the structure used for supporting laser 12. In accordance with the present invention; however, it has been found highly advantageous to project the signal beam from laser 12 in a planar path. This is accomplished in the present invention by disposing laser source 12 to project its beam 14 upwardly and by providing a mirror 15 in the path of the beam 14 to project a signal beam 16 in a horizontal path, or a path having a substantial horizontal component of direction, by reflection. Signal beam 16 from mirror 15 may then be projected in a planar path by providing means for turning or oscillating mirror 15 relative to laser source 12. Although the use of means to effect oscillation of mirror 15 in an arcuate path of less than 360° is contemplated, the work to date has been in conjunction with a hollow shaft electric motor 17, for rotating mirror 15 in a circular or endless path. A collimator lens 18 is provided to aid in the passage of signal beam 14 through the hollow shaft of the motor 17 to mirror 15.

In the projection of a signal beam in the foregoing manner, it is contemplated that it will be desirable in most instances to so orient mirror 15 with respect to laser source 12 as to project beam 16 in a precisely horizontal directional so that beam 16 moves in a horizontal planar path as mirror 15 is rotated. However, the sweeping of signal beam 16 through a planar path other than a horizontal plane, such as a conical path or an inclined planar path may also be advantageous, as more specifically described in connection with FIGS. 4 and 5. For a conical path, the angle of mirror 15 relative to the impacting beam 14 is adjusted to a value other than 45°.

The sweeping signal beam 16 from generating means 11 has utility in the embodiment of FIG. 1 in establishing a reference plane of elevation or datum plane from which to determine the elevation or grade at any particular location within the effective range of beam 16. Thus, as is shown in FIG. 1, there is provided a surveyor's target rod 21 having signal receiver means 22 vertically adjustably mounted thereon. Receiver means may be provided with a photosensitive device at a determinable location to be impinged upon by signal 16. In a preferred arrangement, means 22 is provided with first and second photosensitive devices 23 and 24, preferably selenium or silicon photocells when quantum device 12 is a gas laser, which are vertically spaced from one another on rod 21 by a short distance 25. Photosensitive devices 23 and 24 are coupled, through customary amplification means and the like, to a detector gauge 27 carried by the operator, and are adapted to indicate which of the devices is impinged upon by signal 16, for example, by positive and negative indications on gauge 27. Thus, by the raising or lowering of receiver means 22 as a unit on target rod 21, it will be possible to bring the spacing 25 into precise alignment with signal 16 indicated by a zero signal on gauge 27. Thereafter, the elevation at the location of rod 21 may be ascertained by determining the height of means 22 on rod 21, rod 21 being provided with accurately placed scale markings 28 for this purpose.

In the embodiment of FIG. 2, there may be provided means for generating a sweeping signal beam similar to signal beam 16 of FIG. 1 and noted, therefore, also by numeral 16. Such signal may be, and preferably is, generated by means similar to means 11 of FIG. 1 and is also, therefore, noted by numeral 11.

Signal beam 16 is utilized to advantage, in the embodiment of FIG. 2, in controlling the adjustable elevation of an operating member of a machine used in performing an operation subject to close elevation tolerances. As shown, the operation is earth grading and is performed by a grader machine, shown generally at 31, having a grader blade 32 whose elevation is adjustable by conventional means such as hydraulic motor 33. Mounted atop grader 31 is a photosensitive antenna 34 for receiving signal beam 16, as by means of vertically spaced-apart photocells 35 and 36 in the manner of receiver means 22 of FIG. 1. The output signal from antenna 34, suitably amplified, is delivered to a servomechanism 37 used in controlling the flow of hydraulic fluid from reservoir 38 to and from motor 33 to maintain the elevation of the blade 32 within the desired limits at every point within the effective range of the signal beam 16.

Referring more specifically to FIG. 3, there is schematically illustrated a modified arrangement for generating a rotating planar beam from laser source 12. The originally generated laser beam 14 is directed into one end of a beam transmitting pipe 41 which can constitute the hollow shaft of an electric motor 42 and hence is rotated thereby. At the top end of beam pipe 41 an optical device 44 is rigidly mounted. Device 44 comprises a generally pentagonally shaped prism commonly known as a "Penta-prism." A suitable device of this type is manufactured and sold by Bronson Instrument Company, of Kansas City, Mo. and has the optical characteristic that any beam of radiation that is incident on one of the prism faces will be emitted at exactly 90° to the incident beam. Thus as the prism 44 is rotated or oscillated about the axis of pipe 41, a signal beam 16 will be produced establishing a reference plane exactly perpendicular to the originally emitted beam 12.

The exact position of the aforementioned reference beam with respect to the terrain over which the beam is to be projected may be conveniently adjusted by any conventional mounting of the beam source 12 and associated optical elements to provide for angular adjustment in each of two mutually perpendicular vertical planes. For example, motor 42 and laser source 12 may be mounted in a common support structure 45, which in turn is supported by horizontal pins 46 in the arms of a yoke 47. Yoke 47 is pivotally mounted on a pin 48 mounted in a base 50. The axis of pin 48 is, of course, perpendicular to the axis of pins 46. Conventional micrometer adjusting devices (not shown) are provided to position the support structure 45 in any desired angular relationship with respect to yoke 47, and to position the yoke 47 similarly relative to the base 50.

In the embodiment of the invention as above-described as tested to date, it has been found that satisfactory elevational measurements at substantial distances from the laser beam source can be obtained by means of a swept laser signal beam sweeping through a circular path at a rotational velocity of from 250 to 1,000.

As illustrated in FIGS. 4 and 5, it is not necessary to the utilization of this invention that the resulting laser beam reference plane be horizontal. Thus as schematically shown in FIG. 4, if grading of an inclined surface is desired, the axis of rotation of the laser beam 14 may be inclined relative to the true vertical and the resulting reference beam plane 16 will be parallel to the desired grade. Alternatively, as shown in FIG. 5, the reference beam 16 can be generated in a conical configuration and only one side of the generated reference beam utilized for the grading or surveying operations.

It will also be apparent that one reference signal plane can be used to control a plurality of earth-moving machines operating anywhere within the effective range of the beam generating the plane, thus contributing greatly to the speed and efficiency of any large earth-moving or grading operation.

Referring now to FIG. 6, there is schematically shown still another modified arrangement embodying this invention which produces a laser beam rotating in a vertical plane. Such beam can be utilized for laying out straight-line paths over irregular terrain and hence would be of assistance in laying out fence lines, pipe lines, transmission lines, etc., where it is desirable that the resulting line be as linear as possible.

Gas laser source 12 again comprises the aforementioned Perkin-Elmer Model 5200 unit for producing a continuous laser beam 16 which is directed through an appropriate collimator 18 to impinge a spot beam upon the center of an inclined rotating mirror 50. Mirror 50 is suitably fastened to a 45° inclined face of a cylindrical support 51, which is in turn axially mounted on a horizontal shaft 52 which is journaled by spaced bearings 53. Shaft 52 is rotated at the desired speed of rotation by electric motor 54 through a reducing belt drive comprising small pulley 55 mounted on the motor shaft, belt 56 and a large pulley 57 secured to shaft 52. The resulting rotating laser beam will then be swept through a vertical plane, and this beam may be picked up at substantial distances from the beam source by a manually supported detector unit 60, including a filter lens 63 selected to pass only the frequency of laser beam 16, a photocell 61 and a suitable amplifying circuit (not shown) for energizing a glow discharge lamp 62 each time that the laser beam 16 impinges upon the photocell 61. Thus at any point along the desired line, the operator need only manually move the beam pickup unit 60 to a position where the glow discharge lamp 62 is intermittently flashing and such point will lie on the vertical plane defined by the rotating laser beam 16. It will be obvious that such pickup could be utilized to control the horizontal movements of a travelling implement, such as a trencher or plow, to cause such implement to travel in a straight line regardless of terrain irregularities.

While this invention has been described and illustrated in connection with elevation determinations, it will be obvious that the laser beam reference plane could be vertically directed and thus used as a reference for the construction or inspection of vertical structures, such as dams or buildings; therefore, the term "elevation" is used in the claims as a relative term and intended to include horizontal distances when a vertical plane signal beam is employed, as in the modification of FIG. 6.

LASER BEAM GENERATOR OF FIGS. 9 AND 10

One embodiment of a suitable laser beam generator for practicing the invention is illustrated in FIGS. 9 and 10. Reference numeral 70 refers to a primary base member which is of circular platelike configuration and has a plurality of depending mounting brackets 71 welded thereto to provide a mounting for bolts 72 which respectively pass through the bifurcated ends 73a of adjustable length telescopic tripod legs 73. In this manner, the primary base 70 may be supported by the tripod legs 73 in a roughly horizontal position on any terrain and the elevation of primary base 70 may be roughly adjusted by appropriate adjustment of the lengths of the telescopic tripod legs 73 and the legs 73 may be respectively rigidly clamped in the selected length position by thumbscrews 73b.

Base 70 is further provided with a central depending circular boss 70a welded thereto and a similar boss 70b, formed in two semicircular presses secured to the top surface of primary base 70 by a plurality of bolts 70c. Bosses 70c and 70b are centrally apertured and the interior surface 70d of such aperture is accurately ground after assembly to define a spherical segment bearing surface.

A secondary base element 75 is provided which constitutes a vertically extending hollow member. The lower portion 75a of the secondary base member is somewhat enlarged and is ground to produce an external spherical bearing surface 75b which is cooperable with the interior spherical bearing surface 70d to adjustably mount the secondary base element 75 in a generally vertical position relative to the primary base 70. Such mounting is of course accomplished by removing the top boss 70b from the primary base 70, inserting the secondary base 75 within the bearing aperture 70d of boss 70a and then assembling the two piece top boss 70b thereto which will secure the secondary base 75 to primary base 70 but will permit adjustment of the vertical position of the secondary base element 75 relative to primary base 70.

Near the middle portion of secondary base element 75 a radially projecting flange 75c is provided which overlies the top surface of primary base 70 beyond the perimeter of boss 70b. At equally spaced locations around the perimeter of flange 75c a plurality of threaded apertures 75d are provided which respectively receive the threaded ends 76a of adjusting pins 76. The adjusting pins 76 are each further provided with an enlarged hand grasping collar 76b and a flat head portion 76c which contacts the top surface of primary base 70. A lock nut 76d is provided to lock each adjusting pin 76 in its finally adjusted position. It is therefore apparent that the adjusting pins 76 permit the vertical position of secondary base 75 to be accurately pivotally adjusted to assume a true vertical position by the resulting slight rotational adjustment of the secondary base element 75 about the axis of the cooperating spherical bearing surfaces 70d and 75b.

The top portion of the secondary base 75 is axially slit to define opposed clamping flanges 75f and a plurality of bolts 75e are provided to draw such clamping flanges 75f together. Additionally, a spur gear 75k is journaled between flanges 75f and is rotatable by hand wheel 75j for a purpose to be described.

Secondary base 75 defines a vertically extending cylindrical bore 75g extending completely through the secondary base element. A tubular support 77 is provided having a cylindrical portion 77a which is slidably insertable in the cylindrical bore 75g of secondary base element 75. An axially extending rack gear 77c is secured to the outer wall of tubular support 77 and passes through flanges 75f and cooperates with spur gear 75k. In this manner, the relative vertical position of the tubular portion 77g with respect to the secondary base 75 may be conveniently adjusted by rotating hand wheel 75j and the tubular support 77 may then be locked in any selected vertical position by tightening the clamping bolts 75h. Such adjustment, however, does not produce any deviation of the axis of tubular support 77 from the true vertical; this is determined solely by the pivotal adjustment of secondary base 75 relative to primary base 70.

In the bottom portions of tubular support 77, a laser beam source 78 is suitably mounted to produce a vertically upwardly directed, sharply defined laser beam 80 after passage through a suitable collimator 79. The laser beam source 78 may comprise any conventional gas laser such as the Model No. 500 currently manufactured and sold by Perkin-Elmer Corporation of New Britain, Conn.

The top portion of tubular support 77 is radially enlarged as indicated at 77b and an electric motor 81, which is only schematically illustrated, is suitably mounted in said enlarged portion. Electric motor 81 is provided by a hollow shaft 81a and the laser beam 80 thus passes upwardly through such hollow shaft. On the top end of hollow shaft 81a an optical reflecting device 82 is mounted which is arranged to receive the laser beam 80 and reflect such beam at exactly 90° to the direction of the incidental beam, hence directing the reflected beam at 90° to the axis of tubular support 77 and secondary base bore 75g. Optical device 82 could be an accurate mirror positioned at exactly 45° with respect to the laser beam 80, but preferably comprises a device commonly known as a pentaprism which is currently manufactured and sold by Bronson Instrument Company of Kansas City, Mo. Device 82 is secured to shaft 81a by a support collar 82a.

Lastly, a collar 83 is mounted on the enlarged top portion 77b of tubular support 77 and has an accurately ground, radially extending top surface 83a which is precisely normal to the axis of tubular support 77, and hence the axis of secondary base bore 75g. A pair of mutually perpendicularly disposed fluid bubble level indicators 84 are then mounted at spaced locations on ground surface 83a and the indicating bubbles 84a of such level indicators may be utilized to indicate when the surface 83a is exactly horizontal with respect to gravity, hence when the reflected laser beam 80a will be positioned in a true horizontal plane.

It is therefore apparent that when the laser beam source 78 is energized through the connection to a suitable power source (not shown) and electric motor 81 is similarly energized to rotate or oscillate the optical device 82, the resulting reflected laser beam 80a will sweep through a plane that is precisely normal to the axis of secondary base bore 75g. This plane may be adjusted to be exactly horizontal by rotational adjustment of the positioning pins 76. The elevation of the laser beam plane may be adjusted by hand wheel 75f.

As was previously noted a pentaprism has the optical characteristics wherein any incoming light beam that strikes one prism face will be reflected such that the emitted beam is projected at exactly 90° to the incoming light beam independently of the angle at which the incoming light beam may strike the prism face. Therefore, as the pentaprism is rotated, any small variation in the angular relationship between the pentaprism and the housing on which it is mounted that also contains the laser beam generator will not effect the direction in which the reflected beam from the pentaprism is projected. Thus any small amount of misalignment between the axis or rotation of the pentaprism and the direction in which the beam from the laser beam generator is projected will have no effect on the angular relationship between the reflected and the original direction of the laser beam throughout the 360° through which the reflected beam sweeps. Further, any slight "slop" in the bearings on which the pentaprism is mounted or subsequent wear in these bearings will have no effect on the angular relationship between the projected beam and the incident incoming beam. As is well known, any changes in angular relationship between a reflecting mirror and a beam incident thereon will result in a change in angular relationship between the reflected beam and the incoming incident beam of twice the amount of change in angle between the mirror and the incident beam. Any such changes in angular relationship between the projected beam and the incident beam would be disastrous in surveying operations where tolerances must be held to fractions of an inch throughout the 360° from the original point of reference and at distances up to a mile or even more. For example, grading operations of the type to be controlled by this device are expected to be held to one one-hundredth foot (0.12 inch). Where the graders are operating at distances of 2,000 feet from the reference point, it can be easily seen that the direction in which the rotating laser beam is directed must be controlled with the utmost accuracy throughout its arc. If the direction of the reflected beam were dependent upon the accuracy with which the bearings were aligned and were affected by "slop" or wear in the bearings, this accuracy could not be attained. However, by utilizing a rotating pentaprism in conjunction with a laser beam that is projected in a fixed direction which can be precisely controlled and adjusted with extreme accuracy, a survey reference plane can be established at any desired angular relationship to any desired reference axis, such as the true vertical or horizontal, that is desired within the extremely high tolerances that are required in survey operations.

It is therefore apparent that the described device may be quickly and conveniently set up on any terrain and conveniently adjusted to produce a laser beam sweeping through an exactly horizontal plane, or vertical plane or therebetween. Further, the elevation of such laser beam plane may be adjusted within the limits provided by the possible extension or contraction of the telescopic tripod legs 73 and the permissible axial adjustment of the tubular support 77 relative to the secondary base element 75.

MODIFIED LASER BEAM GENERATOR OF FIGS. 11—13

Figure 11:
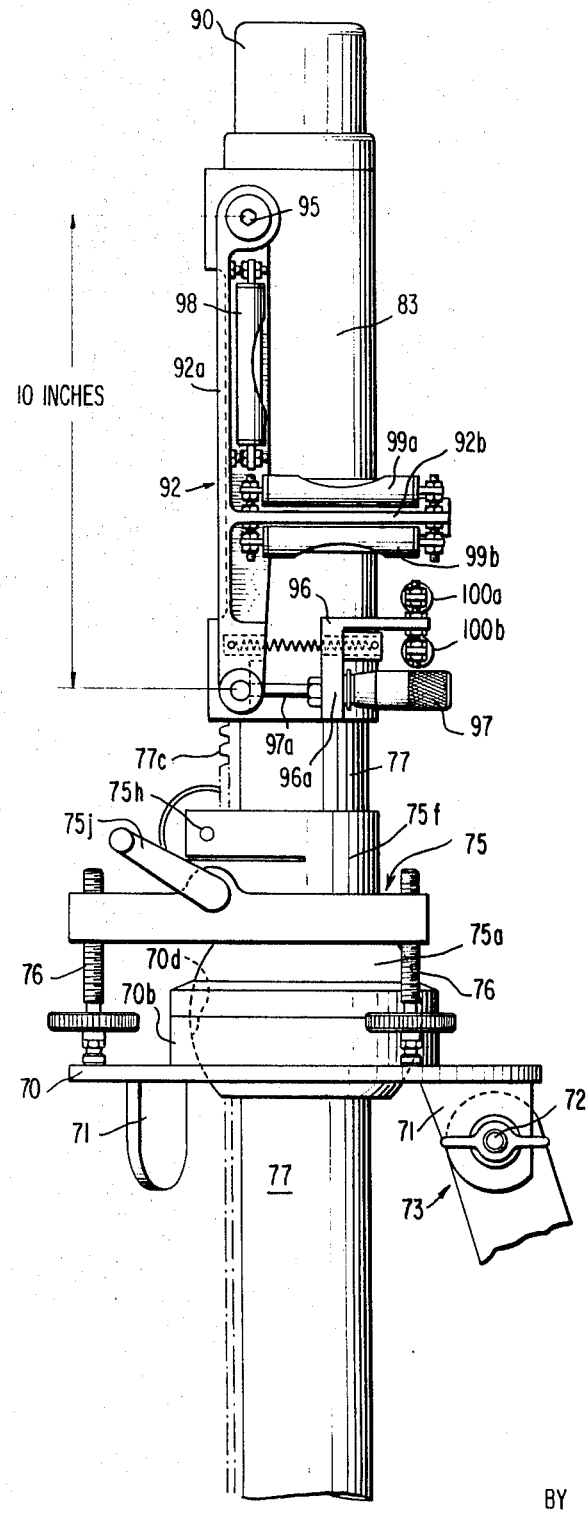
FIG. 11 is a side elevation of a modification of the apparatus of FIG. 9.
Figure 12:
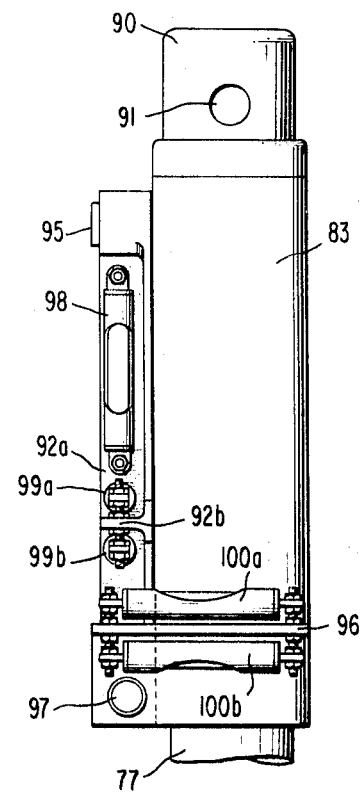
FIG. 12 is a partial front elevation of the apparatus of FIG. 11.
Figure 13:
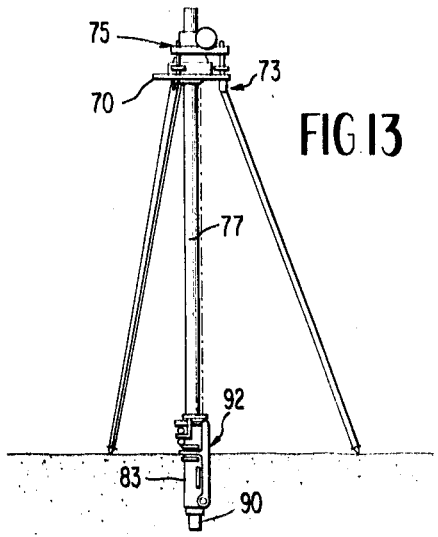
FIG. 13 is a side elevation of the apparatus of FIGS. 11 and 12 in the inverted position.

An alternate embodiment of laser beam signal generating apparatus in which provisions are included for easy and accurate angular alignment of the projected laser beam with respect to the true vertical is illustrated in FIGS. 11—13. This embodiment also makes provisions for easy inversion of the tubular support for the laser beam generator in use close to the ground or below grade operations.

The basic arrangement of the tripod supported, laser beam signal generating device of FIGS. 11—13 generally conforms to that discussed above of FIGS. 9 and 10. The parts of the embodiment of FIGS. 11—13 which substantially conform to the parts of the previously described embodiment of FIGS. 9 and 10 are identified by the same reference numerals. As in the previous embodiment, the primary base structure 70 of a circular platelike configuration is supportingly connected through the depending mounting brackets 71 and the mounting bolts 72 to the legs of the tripod 73. An upper segment, or boss, 70b atop the circular base structure 70 has its hollow interior surface accurately ground to define a spherical bearing surface 70d. The secondary base element 75 is pivotally mounted on the primary base structure 70 with its lower spherical segment 75a contained within the spherical bearing area 70d of the primary base structure. Three adjusting pins 76 are threadably connected at equally spaced intervals around the outer periphery of the central flange region of the secondary base element 75 to extend downwardly with the lower end of the adjusting pins contacting the upper surface of the plate area of the primary base structure 70 so that the secondary base element 75 can be angularly adjusted in two mutually perpendicular planes relative to the primary base structure 70. The elongated tubular support 77, in which the laser beam generator is contained, extends through and is supported by the secondary base element 75, the upper portion 75f of which is slotted to form clamping flanges which can be tightened around the tubular support 77 by means of a clamping bolt 75h which extends through the opposed clamping flanges of the upper segment 75f of the secondary base element to tighten the base element around the tubular support 77. A rack 77c extends lengthwise along one side of the tubular support 77 and meshes with a spur gear mounted on the secondary base element 75 and actuated by the rotatable handle 75j to raise and lower the tubular support 77 within the secondary base element and primary base structure of the tripod support. An enlarged collar 83 is affixed around the top portion of the tubular support 77 immediately below the pentaprism which rotatably mounted on the top of the tubular support 77 and contained within a hood 90 that is affixed to the rotatably mounted support for the pentaprism, an aperture 91 being cut in the front face of the hood 90 through which the reflected beam from the pentaprism is projected.

With the exception of the hood 90, the above structure is generally similar to that illustrated with respect to the embodiment of FIGS. 9 and 10, the pentaprism not being shown in FIGS. 11 and 12 but being mounted to rotate within the hood 90 at the longitudinal axis of the tubular support 77 so that the laser beam generated by the laser beam generator contained within the tubular support 77 strikes the pentaprism and is reflected at exactly 90° to the incoming beam to project outwardly through the aperture 91 in the pentaprism hood. The pentaprism can be rotated by a motor mounted integrally within the tubular support structure 77, as in the case of FIG. 9, or the rotating motor could be mounted externally of the tubular support 77 and through suitable drive means rotate a shaft to which the pentaprism is affixed.

A distorted, T-shaped sine bar 92, having an elongated vertical segment 92a and perpendicular thereto a centrally located horizontal segment 92b, is pivoted to the upper portion of the collar 83 of the tubular support by pivot 95. A leveling bar 96 is affixed to the lower portion of the tubular support collar 83 to extend transversely thereof parallel to the pivot 95 of the sine bar and at 90° to the plane of the sine bar 92. A micrometer 97 is affixed to a downwardly depending flange 96a of the leveling bar with the shaft 97a of the micrometer extending transversely of the collar 83 so that the end of the shaft 97a contacts the lower end portion of the vertical segment 92a of the sine bar. The distance from the top pivot 95 of sine bar 92 to the point of contact of the micrometer shaft 97a with the sine bar is exactly 10 inches, as illustrated in FIG. 11. The pertinency of this dimension will be subsequently discussed in relationship to the adjustment of the micrometer screw in pivoting the sine bar 92 relative to the collar 83.

Three leveling bubbles are mounted on the sine bar 92 as illustrated in FIG. 11. The first bubble 98 is mounted parallel to the longitudinal axis of the vertical sine bar segment 92a and the other two leveling bubbles 99a 99b are mounted parallel to and on opposite sides of the central segment 92b of the sine bar. Two additional leveling bubbles 100a and 100b are mounted parallel to and on opposite sides of the leveling bar 97 so as to be at exactly 90° to the longitudinal axis of the tubular support 77 and the direction of the laser beam projected from the laser beam generator mounted within the tubular support.

As can be readily ascertained, if the micrometer 97 is set to zero so that the vertical segment 92a of the sine bar is parallel to the longitudinal axis of the tubular support 77, along which the beam from the laser beam generator is projected, and the horizontal bubble 99a on the sine bar is normal to the tubular support 77, the laser beam reflected through the aperture 91 from the pentaprism will be perpendicular to the true vertical when the upper horizontal bubble 99a of the sine bar and the upper bubble 100a of the leveling bar are centered. By tilting the sine bar 92 through adjustment of the micrometer 97 and then releveling the upper horizontal sine bar bubble 99a through adjustment of the adjusting pins 76, the direction of the laser beam projected from the pentaprism and the plane defined by the rotating laser beam can be adjusted relative to the true vertical. Due to the dimensions noted above the sine bar, the micrometer will adjust in the ratio of 10 to 0.001 inches, which provides a convenient manner of establishing a survey grade, or slope per 100 feet. If a grade of 1.32 feet per 100 feet is required, the plane of the projected laser beam will be established at this grade if the micrometer is set to read 0.132 inches and the horizontal bubbles are leveled.

The vertical bubble 98 on the sine bar is utilized when the tubular mount 77 is to be positioned substantially horizontally so that the laser beam is projected in a generally vertical direction so that rotating beam will define a vertically oriented plane. The lower horizontal bubbles 99b and 100b on the sine bar and the leveling bar, respectively, are utilized when the tubular support 77 is mounted in the inverted position as is illustrated in FIG. 13. By placing the tubular support in the inverted position of FIG. 13, the projected laser beam may be positioned very close to the ground or below the level of the ground within ditches, such as in tile or pipe laying operations. In certain of these situations the laser beam motor is stopped so that laser beam is projected along a fixed line. Thus this pivoting sine bar arrangement provides a convenient and easy manner for accurately aligning a fixed laser beam or a plane defined by a rotating laser beam in a generally horizontal or vertical direction such that the angular relationship with respect to the true vertical (or the true horizontal) can be adjusted within the very close tolerances required in survey operations.

As will be evident to those skilled in the art, modifications of this invention can be made in the light of the foregoing disclosure without departing from the scope of the appended claims.

I claim:

1. A planar laser beam generator comprising a primary base, means on said primary base defining an interior spherical segment bearing surface, a secondary base element having an external spherical segment bearing surface journaled in said primary base bearing surface, said secondary base element having a vertically disposed aperture therein, a laser beam source, tubular means inserted in said secondary base aperture and mounting said laser beam source therein to project the laser beam in a direction parallel to the axis of said vertical aperture, a pentaprism, means for rotatably mounting said pentaprism relative to said secondary base element with the laser beam normal to the input face of said pentaprism, whereby rotation or oscillation of said pentaprism generates laser beam plane perpendicular to the original laser beam, and means for adjusting the vertical angular position of said secondary base element relative to said primary base, whereby said generated laser beam plane can be adjusted to be exactly horizontal or at any desired angle to the horizontal.

2. The combination defined in claim 1, wherein said means for rotatably mounting said pentaprism comprises an electric motor supported on said tubular means, said electric motor having a hollow shaft axially aligned with said laser beam, and means on the beam discharge end of said hollow shaft for supporting said pentaprism.

3. Apparatus for establishing a survey reference plane comprising a laser beam generator, means for supporting said laser beam generator with the generated laser beam extending away therefrom along a stationary line of direction, (a said support means including means for angular adjustment of said generator and said beam line of direction with respect to a reference axis in space to include the true vertical, beam deflection means for reflecting said generated laser beam and projecting said reflected beam therefrom at a constant fixed angle to the line of direction of said generated laser beam independently of the angular relationship between said deflection means and said line of direction, means for rotatably mounting said deflection means on said support means for comovement therewith and means for rotating said deflection means relative to said support means substantially about said line of direction 4. Apparatus according to claim 3 wherein said laser beam support means includes a hollow housing defining an elongated cavity having at least one open end from which said laser beam is initially projected in substantial alignment with the longitudinal axis of the cavity of said housing and means for mounting said housing for angular adjustment with respect to said reference axis.

5. The apparatus according to claim 4, wherein said housing comprises a tubular inner housing portion inserted in an axial bore of an outer housing portion, the outer housing portion having a spherical bearing surface journaled in a corresponding spherical bearing surface of a support structure.

6. The apparatus according to claim 5, wherein the inner housing portion is axially slidably and adjustably disposed within the outer housing portion.

7. Survey reference apparatus comprising a primary support structure, a laser beam source, a hollow housing defining an elongated cavity having at least one open end and receiving said laser beam source therein with the generated laser beam directed out of said open end, means for mounting said housing on said support structure in a generally vertical position and with said laser beam projecting upwardly, said mounting means including means for angularly adjusting the position of said housing to precisely position the laser beam in a known relationship to the true vertical, an optical device having a set of multiple reflecting surfaces from which an incident light beam is reflected and projected therefrom at a fixed angle relative to the incoming beam, and means for rotatably mounting said optical device on said housing above said open end for comovement therewith in the path of said upwardly directed laser beam, whereby rotation or oscillation of said optical device causes the reflected laser beam to sweep through a plane at a known angle to the true vertical.

8. The apparatus of claim 7 wherein said optical device is a pentaprism rotatably mounted on said housing for rotation about an extension of the longitudinal axis of said housing cavity with the laser beam substantially normal to the input face of said pentaprism, whereby rotation of said pentaprism projects a laser beam in a plane perpendicular to the beam emitted from said generating means.

9. The apparatus of claim 7 additionally comprising means for adjusting the vertical position of said optical device relative to said primary support structure.

10. The apparatus of claim 8, wherein said means for rotatably mounting said pentaprism comprise an electric motor supported on said housing, a hollow shaft on said electric motor axially aligned with said laser beam, and means on the beam discharge end of said hollow shaft for supporting said pentaprism.

11. Surveying reference apparatus comprising means for generating a laser beam, means for supporting said beam generating means and initially projecting the laser beam emitted by said generating means along a reference axis, means for deflecting said beam in a fixed angular relationship to the direction of the projected beam independently of changes in the angular relationship between said deflection means and said reference axis, means for rotating said deflecting means relative to said laser beam generating means, thereby swinging said reflected beam in an arc about said reference axis and transversely thereto in a fixed angular relationship, means spaced from said supporting means for detecting said swinging beam, said beam detecting means including a narrow band-pass optical filter selected to transmit the laser beam and block all other ambient light incident thereon.

12. The apparatus of claim 11, additionally comprising a machine having an operating member whose position is adjustable, means mounting said beam detecting means on said machine, and means responsive to said beam detecting means to adjust the position of said operating member of said machine to maintain a predetermined relationship between the plane of the arc of said projected beam and said operating member.

13. A method of survey reference control comprising the steps of directing a stationary laser beam along a reference axis, intercepting said laser beam by a pentaprism positioned on said reference axis to deflect and project said beam away from the pentaprism at a fixed angular relationship to the original direction of said beam transversely of said reference axis, adjusting said reference axis in relationship to the true vertical, rotating said pentaprism and projected beam in an arc about said reference axis, and, at a location spaced from said reference axis, sensing the projected beam.

14. The method of claim 13 additionally comprising the sensing of the locus of said projected beam in spaced relation to a known datum point on the earth.

15. The method of claim 13 additionally comprising the steps of sensing said projected beam from a machine having an operating member whose position is adjustable and adjusting the position of the operating member of said machine to maintain a predetermined relationship between the arc of said projected beam and said operating member.

16. The method of claim 13 wherein the projected laser beam is passed through a narrow band-pass optical filter prior to sensing the beam to prevent any sensing response due to ambient light.

PO-1050
(5/69)

UNITED STATES PATENT OFFICE
CERTIFICATE OF CORRECTION

Patent No. __3,588,249__          Dated __June 28, 1971__

Inventor(s) __Robert H. Studebaker__

It is certified that error appears in the above-identified patent and that said Letters Patent are hereby corrected as shown below:

Claim 3. Apparatus for establishing a survey reference plane comprising a laser beam generator, means for supporting said laser beam generator with the generated laser beam extending away therefrom along a stationary line of direction, said support means including means for angular adjustment of said generator and said beam line of direction with respect to a reference axis in space to include the true vertical, beam deflection means for reflecting said generated laser beam and projecting said reflected beam therefrom at a constant fixed angle to the line of direction of said generated laser beam independently of the angular relationship between said deflection means and said line of direction, means for rotatably mounting said deflection means on said support means for comovement therewith and means for rotating said deflection means relative to said support means substantially about said line of direction.

Signed and sealed this 23rd day of November 1971.

(SEAL)
Attest:

EDWARD M. FLETCHER, JR.          ROBERT GOTTSCHALK
Attesting Officer                Acting Commissioner of Patents